United States Patent [19]

Knitter et al.

[11] 3,746,933

[45] July 17, 1973

[54] HOUSING ASSEMBLY FOR CONTACTS

[75] Inventors: Heinz Wolfgang Knitter, Heilbronn; Joseph Veszelik, Weinsberg, both of Germany

[73] Assignee: Bunker Ramo Corporation, Oak Brook, Ill.

[22] Filed: Apr. 10, 1972

[21] Appl. No.: 242,562

[30] Foreign Application Priority Data

Apr. 23, 1971 Germany .................. P 21 19 987.1

[52] U.S. Cl. ........................ 317/101 CC, 200/168 C

[51] Int. Cl. ............................................. H02b 1/04

[58] Field of Search .................. 200/168 C, 166 PC; 317/101 CC

[56] References Cited

UNITED STATES PATENTS

| | | | |
|---|---|---|---|
| 3,297,974 | 1/1967 | Pittman | 317/101 CC |
| 3,393,449 | 7/1968 | Garcia | 317/101 CC |
| 3,624,320 | 11/1971 | Eberhart | 200/168 C |

*Primary Examiner*—Herman J. Hohauser
*Assistant Examiner*—William J. Smith
*Attorney*—Frederick M. Arbuckle

[57] ABSTRACT

A housing assembly for contacts, the assembly comprising a contact-housing board and a lid for covering one of the surfaces of the contact-housing board and retaining the contacts within the assembly. The contact-housing board has contact chambers extending through the contact-housing board from one surface to an opposite surface, the chambers being adapted to accept contacts. A pair of opposite ends of the contact-housing board extend outwardly to form attachment extensions, and each of these extensions has a mounting hole extending through the extension. The lid also has extensions which overlap the mounting holes in the contact-housing board. The lid extensions have openings that are aligned with the mounting holes. The contact-housing board and the lid can be securely held together and mounted to a mating part through the mounting holes and the openings. In a preferred embodiment, the lid is provided with flanges extending over the sides of the contact-housing board, and the flanges have recesses which interlock with mating cams on the sides of the contact-housing board so that the two parts can be snap fastened together.

1 Claim, 7 Drawing Figures

HOUSING ASSEMBLY FOR CONTACTS

BACKGROUND OF THE INVENTION

1. Field of the Invention

This invention relates to the field of housings for accepting a multiplicity of contacts, particularly contact-housing assemblies for use with printed circuit connectors.

2. Description of the Prior Art

Contact-housing boards are used mainly in printed circuits. Electrical connection is established between a female plug-in board and a male spring-contact board by introducing the contacts of the spring-contact board into the plug-in board. In a known embodiment, a lid of a plug-in board is connected to a contact-housing board by means of appropriately shaped interlocking cams and recesses so that the enclosed contacts are held in their positions. When the connection is established or opened, friction forces, which exist between the interlocking contacts, result in forces acting upon the lid via the contacts. In the case of contact-housing boards with relatively few contacts, these forces can be compensated for by the locking engagment between the lid and the contact-housing board. In the case of printed circuits with numerous connectors, this type of support of the lid no longer suffices for compensating for the above-mentioned forces. It has been suggested that the lid be glued to the contact-housing board or soldered to the same by means of ultra-sound in order to obtain a connection in addition to the lock. However, this type of lock implies relatively expensive additional operations which increase the production cost without resulting in the required stable connection capable of withstanding high loads.

SUMMARY OF THE INVENTION

It is an object of the invention to provide an improved housing assembly for retaining contacts within a contact-housing board using a mating lid which is securely fastened to the contact-housing board.

According to the invention, the lid is provided with an extension which protrudes over mounting holes in the contact-housing board and the lid extension is provided with openings aligned with the mounting holes.

The form of the lid, which according to the invention, overlaps the mounting holes in extensions of the contact-housing board, allows a firm connection of the lid to the contact-housing board when the contact-housing board is mounted on a printed circuit. Conventional screws or rivets are used for the attachment of the housing assembly.

In one embodiment, the lid is provided with flanges extending perpendicular to the plane of the lid and around the sides of the contact-housing board. The flanges and the contact-housing board portions covered by the flanges are provided with appropriately shaped, interlocking cams and recesses. This configuration is easy to manufacture and forms a lock connection which is easy to handle.

In a further embodiment, the lid is reinforced in the area of the openings. This helps to avoid damage which may result from the forces acting when the connection is assembled or disassembled.

BRIEF DESCRIPTION OF THE DRAWINGS

The invention will now be described in detail with reference to the accompanying drawings representing preferred embodiments of the housing assembly. In the drawings.

DESCRIPTION OF THE PREFERRED EMBODIMENT

Figure 1:
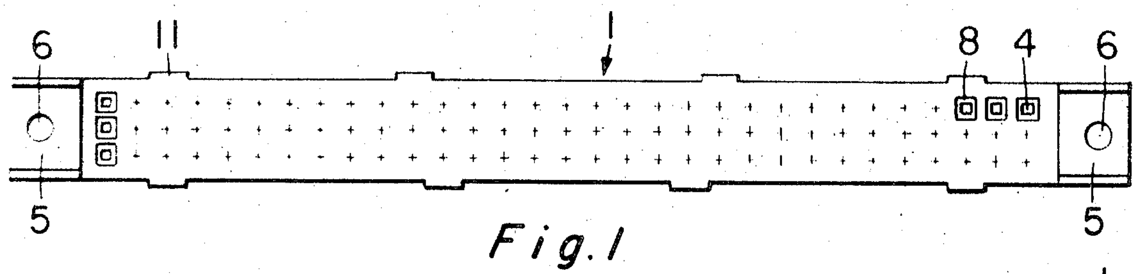
FIG. 1 is a top view of a contact-housing board according to the invention.
Figure 2:
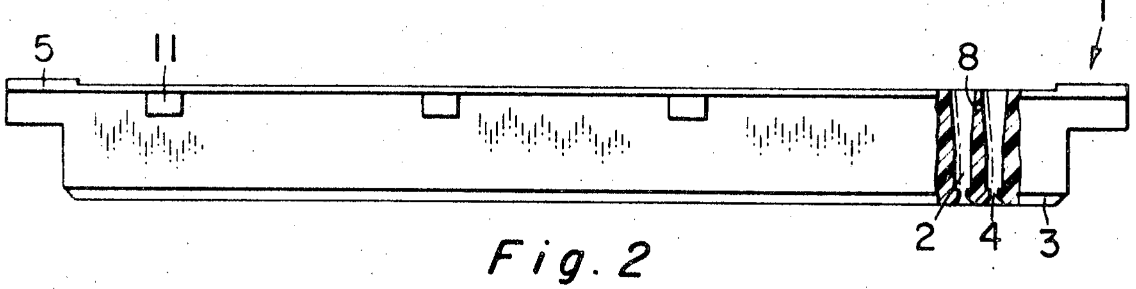
FIG. 2 is a side view of the contact-housing board of FIG. 1.
Figure 3:
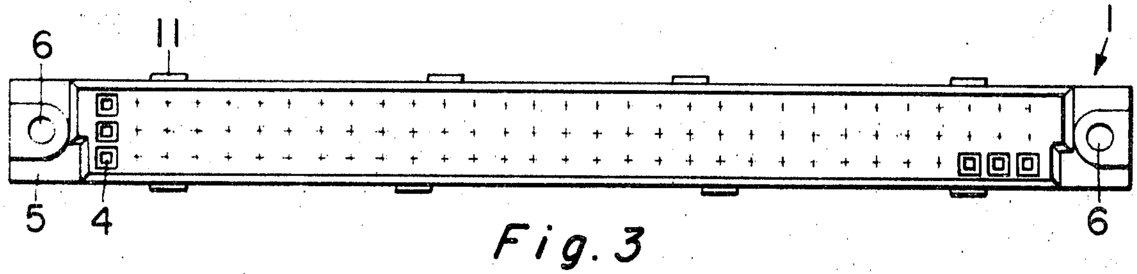
FIG. 3 is a bottom view of the contact-housing board of FIG. 1.

FIGS. 1 to 3 show the contact-housing board of a plug-in board which has several contact chambers 2 in its interior. Contact chambers 2 accept individual connector contacts (now shown). FIG. 2 shows part of the lid wall broken away and displays two adjacent contact chambers 2. As shown in FIG. 2, each contact chamber 2 is provided with a funnel-like opening 4 in the area of bottom 3 of the contact-housing board. The contacts of a male spring-contact board may be introduced into the connector contacts via these openings. Contact-housing board 1 is provided with extensions 5 for attachment at opposite ends; these extensions serve for mounting the contact-housing board on a printed circuit or other carrier. Each extension 5 is provided with a mounting hole 6.

Figure 4:
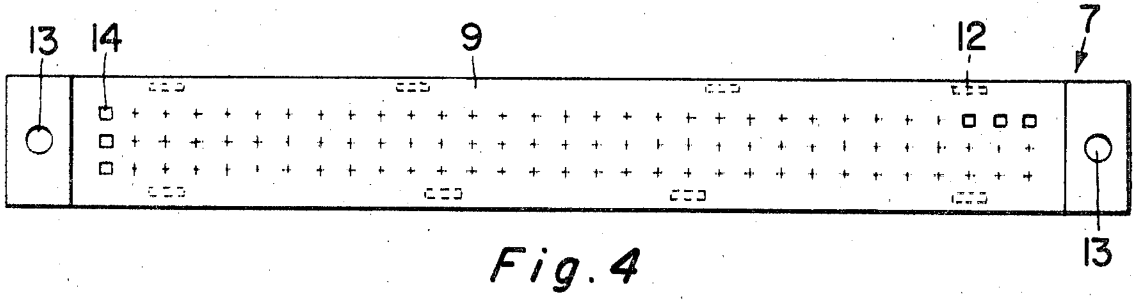
FIG. 4 is a top view of a lid portion fitting the contact-housing board shown in FIg. 1.
Figures 5, 6, 7:
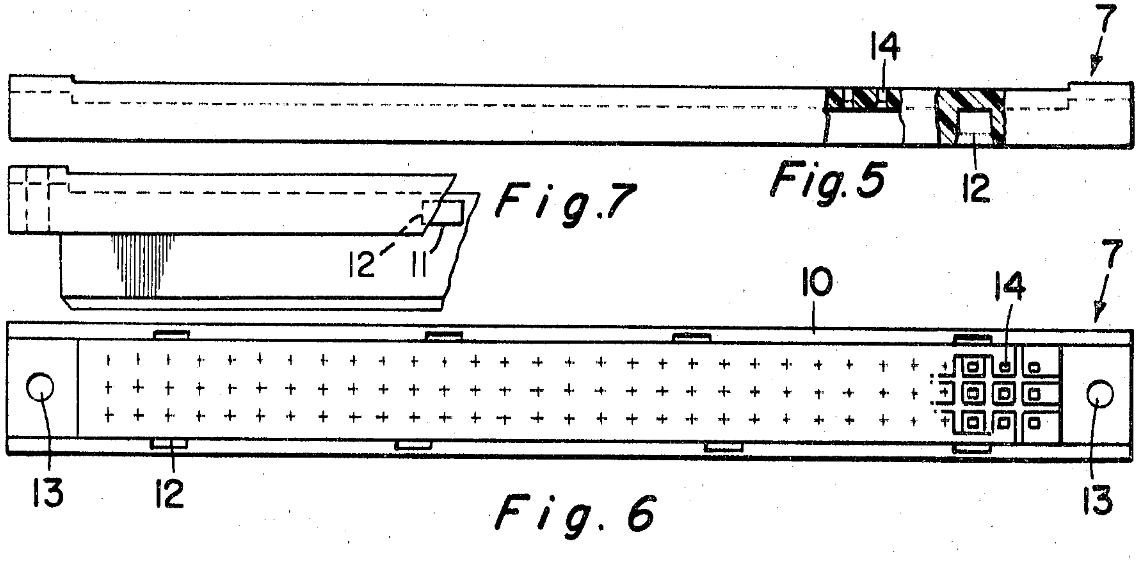
FIG. 5 is a side view of the lid portion shown in FIG. 4.
FIG. 6 is a bottom view of the lid shown in FIG 4.
FIG. 7 is a fragmentary view of the board and lid in assembled relation, showing the alignment of mounting holes and the correspondence of cam and recess.

Lid 7 shown in FIGS. 4 to 6 serves the purpose of closing opening 8 in the contact-housing board (FIGS. 1 and 2) and of keeping the contacts in their positions in the contact-housing board 1. Lid 7 is provided with a plane cover plate 9 and with flanges 10 extending along the long edges of cover plate 9, perpendicular to the plane of the same. These flanges are mounted at a distance equal to the width of contact-housing board 1 so that they surround the lateral walls of the contact-housing board. Lid 7 snaps on contact-housing board 1. Along the lateral walls of contact-housing board 1, there are provided locking cams 11, while lid 7 is provided with appropriate recesses 12 at corresponding areas on the inside of flanges 10. By pressing lid 7 onto contact-housing board 1, flanges 10 of lid 7 are bent sidewards so that locking cams 11 snap into recesses 12.

As shown in FIGS. 4 to 6, the width of lid 7 is such that the lid extends beyond extension 5 when placed on contact-housing board 1. Lid 7 is provided with openings 13 at both ends, and openings 13 are aligned with mounting holes 6 in contact-housing board 1. As can be seen from FIG. 4, lid 7 is provided with openings 14 spaced according to the distance of the contact chambers so that extensions of the plug-in contacts, e.g. soldering lugs, can protrude through said openings.

When the housing assembly is mounted on the printed circuit by means of screws or rivets, lid 7 is connected with contact-housing board 1 at its ends, in addition to the snap-lock. This additional connection can sustain considerable forces which result when a spring contact board is inserted into a plug-in board. The load exerted upon the lock formed by locking cams 11 and recesses 12 is greatly relieved by this configuration.

Though contact-housing boards of this type are almost exclusively used for plug-in contacts, these contact-housing boards can also be modified for accepting multiple connectors.

From the foregoing, it can be readily realized that this invention can assume various embodiments. Thus, it is to be understood that the invention is not limited to the specific embodiments described herein, but is to be limited only by the appended claims.

What we claim is:

1. A housing assembly for contacts comprising:

a contact housing board having contact chambers extending therethrough from one surface to an opposite surface, said chambers being adapted to accept said contacts, said board having a pair of oppositely disposed ends extending outwardly to form attachment extensions, each of said extensions having a mounting hole extending through said extension perpendicular to the plane of said board, and a lid covering one of said surfaces, said lid having flanges extending perpendicular to the plane of said lid and around a portion of at least two opposite sides of said board, said flanges having recesses, and said sides of said board having cams which interlock with said recesses, said lid further having extensions which overlap said mounting holes, each of said lid extensions having an opening aligned with one of said mounting holes, whereby said board and said lid can be snap-fastened together by means of said interlocking cams and recesses, and securely held together and attached to a mounting surface by fastening means passing through said mounting holes.

* * * * *